(12) United States Patent
Re Fiorentin et al.

(10) Patent No.: US 7,950,429 B2
(45) Date of Patent: May 31, 2011

(54) TYRE FOR VEHICLES, IN PARTICULAR MOTOR VEHICLES

(75) Inventors: Stefano Re Fiorentin, Grugliasco (IT); Mario Palazzetti, Avigliana (IT); Giovanni Monfrino, Moncalieri (IT)

(73) Assignee: Fiat Auto S.p.A., Turin (IT)

( * ) Notice: Subject to any disclaimer, the term of this patent is extended or adjusted under 35 U.S.C. 154(b) by 1014 days.

(21) Appl. No.: 10/591,017

(22) PCT Filed: Jun. 15, 2004

(86) PCT No.: PCT/IT2004/000347
§ 371 (c)(1),
(2), (4) Date: Jun. 20, 2007

(87) PCT Pub. No.: WO2005/082643
PCT Pub. Date: Sep. 9, 2005

(65) Prior Publication Data
US 2007/0261774 A1    Nov. 15, 2007

(30) Foreign Application Priority Data

Feb. 27, 2004   (IT) .............................. TO2004A0120

(51) Int. Cl.
*B60C 5/00* (2006.01)
*B60C 11/00* (2006.01)
(52) U.S. Cl. ........ 152/450; 152/167; 152/195; 152/196; 152/197; 152/203
(58) Field of Classification Search .................. 152/167, 152/169, 170, 171, 172, 195, 196, 197, 198, 152/199, 200, 201, 202, 203, 204, 205, 206, 207, 208, 450
See application file for complete search history.

(56) References Cited

U.S. PATENT DOCUMENTS

| 3,789,899 | A | * | 2/1974 | Kobayashi | 152/510 |
|---|---|---|---|---|---|
| 4,170,524 | A | * | 10/1979 | Nakajyo et al. | 205/136 |
| 4,456,048 | A | * | 6/1984 | Markow et al. | 152/517 |
| 6,503,973 | B2 | * | 1/2003 | Robert et al. | 524/492 |
| 6,923,233 | B1 | * | 8/2005 | Girault et al. | 152/516 |

FOREIGN PATENT DOCUMENTS

| DE | 2348038 | * | 4/1975 |
|---|---|---|---|
| DE | 3604023 | * | 8/1987 |
| JP | 51-151901 | * | 12/1976 |
| JP | 53000503 | * | 1/1978 |
| JP | 8-99508 | * | 4/1996 |
| JP | 2002-29212 | * | 1/2002 |

* cited by examiner

*Primary Examiner* — Justin Fischer
(74) *Attorney, Agent, or Firm* — Mitchell P. Brook; Luce, Forward, Hamilton & Scripps LLP (57) ABSTRACT

A tire for vehicles which does not require pressurization by means of a pressurized fluid has a tread, two sidewalls, and two beads which are attached to a wheel rim made of elastomer material, and is provided with at least one tubular reinforcement body which is associated with the tread; each of the sidewalls having a respective homogeneous resilient annular membrane, a straight generatrix of which forms an angle (A) other than 90° with the axis of the tire; the membranes being stretched radially between the tread and the beads such as to be pre-tensioned in the absence of external loads acting on the tire.

29 Claims, 6 Drawing Sheets

TYRE FOR VEHICLES, IN PARTICULAR MOTOR VEHICLES

TECHNICAL FIELD

The present invention relates to a tyre for vehicles.

BACKGROUND ART

In the field of tyres for vehicles in general, and of motor vehicles in particular, it is known to produce tyres which have radial half-sections in the shape of an omega and comprise a tread and two convex sidewalls, each of which ends in a bead which, in use, can co-operate in a flush manner with an annular portion of a corresponding rim. When the tyre is connected to the rim, together with the rim itself it delimits a chamber, which, again in use, is filled with air or another pressurised fluid. The pressure of the fluid in the said chamber is determined according to the type of tyre, and to the stress conditions to which it is assumed that the tyre itself may be subjected.

Although the known tyres are universally used, they suffer from some disadvantages. Firstly, specifically because of their shape and the fact that they are pressurised, they have high levels of rolling resistance caused by high levels of hysteresis, which in use are responsible for heating of the tyre and uncontrollable variation of the efficiency and reliability of the tyre itself.

In addition, since it is necessary to meet specific requirements of road hold, including when water is present on the road surface, the tread is grooved to form a plurality of channels which are transverse relative to the direction of running of the vehicle, and which, since they open up to the exterior of the tyre, discharge the water which is present into the area of interface of the tyre/road surface. Although on the one hand the presence of these transverse channels makes it possible to increase the road hold in wet conditions, on the other hand it is a source of troublesome noise emissions. The type, dimensions and distribution of these transverse channels on the tread are therefore always a compromise between the various requirements.

In addition, the known tyres require periodic checks on the inflation pressure, which varies over a period of time as a result of the inevitable leakages, and the tyres also need to be replaced if they are punctured.

Finally, the known tyres determine the geometry of the rim, which must have a perimetric tubular portion which is free from apertures, in order to delimit the chamber for the pressurised fluid, and must permit fitting of the inflation valve. For these reasons, in the known solutions, the wheel/rim assembly has relatively high weights which generate inevitable forces of inertia, which, as is known, affect both the acceleration and the braking.

DISCLOSURE OF INVENTION

The object of the invention is thus to provide a tyre for vehicles which makes it possible to solve the above-described problems simply and economically, and in particular which makes it possible to obtain a high level of driving comfort in any condition in which it is used.

According to the present invention, a tyre is provided for vehicles, in particular for motor vehicles, which has an axis of symmetry and comprises a tread, two sidewalls, and two beads which are attached to a wheel rim made of elastomer material, characterised in that it additionally comprises at least one tubular reinforcement body which is coaxial to the said axis, is surrounded by the said tread, and extends between the said sidewalls; each of the said sidewalls comprising a respective resilient annular membrane with a straight generatrix which forms an angle other than 90° with the axis of the tyre.

Preferably, in the above-defined tyre, the said tubular body has a dimension, measured parallel to the said axis, which is substantially the same as that of the tread measured in the same direction. Also preferably, the said membranes are stretched between the said tread and the said beads, such as to be pre-tensioned in the absence of loads on the tyre.

Also preferably, the generatrices of the said membranes converge towards one another such as to meet at a point outside the tread. Alternatively, the generatrices of the said membranes converge towards one another such as to meet at a point inside the tyre.

Advantageously, the said tubular reinforcement body comprises an annular belt and a plurality of blocks which are supported by the said annular belt in positions which are adjacent to one another, and can be forced against one another in order to apply resistance to the circumferential actions of compression which are present on the tyre during rotation of the tyre itself.

BRIEF DESCRIPTION OF THE DRAWINGS

The invention will now be described with reference to the attached figures, which illustrate some non-limiting embodiments of it, in which.

BEST MODE FOR CARRYING OUT THE INVENTION

Figure 1:
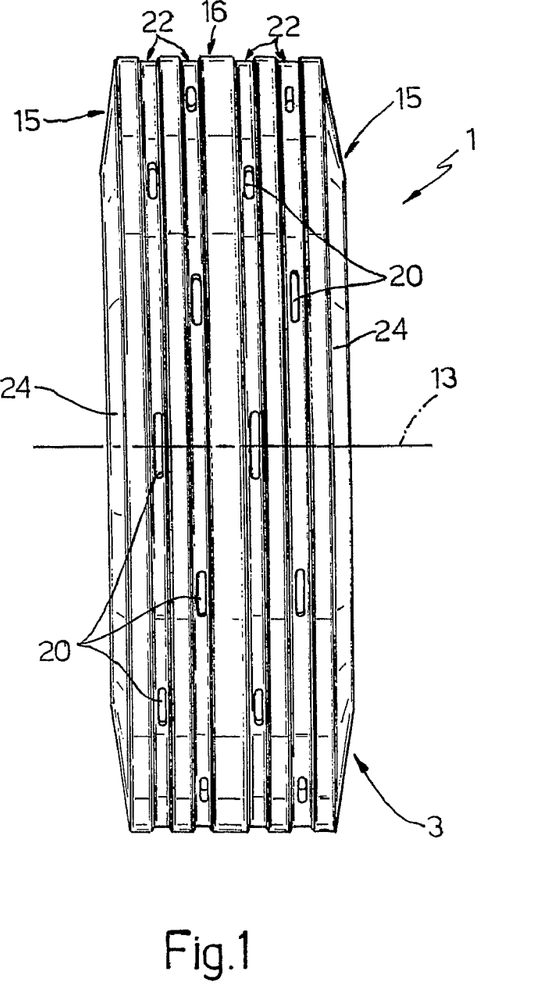
FIG. 1 illustrates in front elevation a preferred embodiment of a tyre produced according to the dictates of the present invention.

In FIG. 1, 1 indicates as a whole a wheel unit for a vehicle, and in particular a motor vehicle (not illustrated), comprising a wheel rim 2 (FIGS. 2 and 3), and a tyre 3 fitted onto the wheel rim 2 itself.

The wheel rim 2 comprises a central attachment portion 5, and two radial annular flanges 6 which project from the portion 5 and support respective seats 7, each of which accommodates a corresponding bead 8 of the tyre 3. The beads 8 each have their own anchorage projection 9, and are engaged with the seats 7 by respective annular discs 10 which are connected to the respective flanges 6 by means of screws 11. The portion 5 comprises a cylindrical wall 12, which extends coaxially to the axis 13 of the wheel rim 2 in the position facing the tyre 3, in order to connect the flanges 6 to one another, and is provided with a plurality of permanently open through-apertures 14, only one of which can be seen in FIGS. 2 and 3.

The tyre 3, which can support the load transmitted by the wheel rim 2 without needing to be pressurised by air or other pressurised fluids, comprises two sidewalls 15, which are connected firstly to the beads 8 and secondly to a tread 16. The beads 8, the tread 16 and the sidewalls 15 are made of elastomer material, as will become more apparent from the following description.

Figure 2:
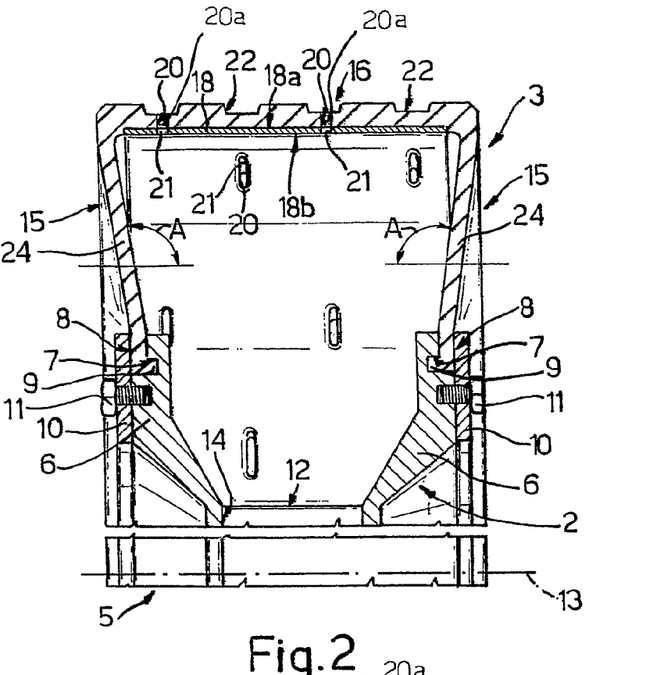
FIG. 2 is a half-section of the tyre according to the line II-II in FIG. 1, fitted onto a wheel rim.
Figure 3:
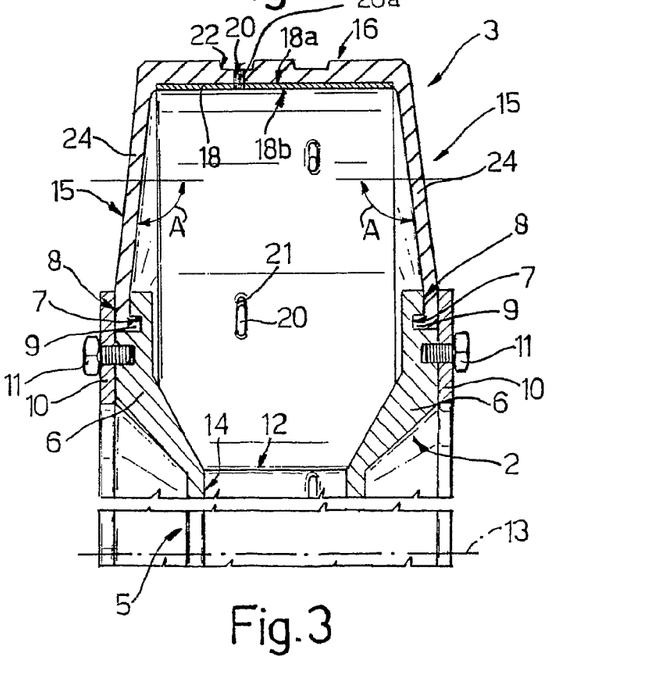
FIG. 3 is a figure similar to FIG. 2, and illustrates a variant of a portion of the tyre in FIG. 1.
Figure 4:
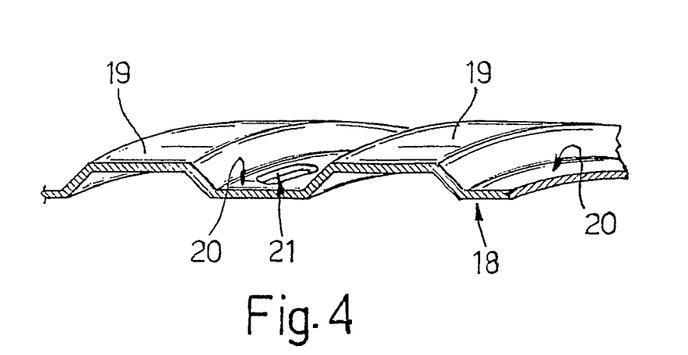
FIG. 4 illustrates a variant of a detail of FIGS. 2 and 3.

The tyre 3 additionally comprises a homogenous tubular reinforcement body 18 (FIGS. 2 and 3), which extends coaxially to the axis 13, and is made of a material other than the said elastomer material, and preferably of harmonic steel or of fibre-reinforced plastics material of the thermoplastic or thermosetting type. As also illustrated in FIGS. 2 and 3, the tubular body 18 has a dimension measured parallel to the axis 13 which is substantially the same as that of the tread 16 measured in the same direction, and is delimited radially by two cylindrical lateral surfaces 18a and 18b which are coaxial to the axis 13 and have generatrix lines which are straight, and are parallel to one another and to the axis 13. According to the variant illustrated in FIG. 4, the tubular body 18 is a corrugated body with a plurality of circumferential ribs 19, which delimit between one another a plurality of circumferential grooves 20. The tread 16 is vulcanised on the outer surface of the tubular body 18, which is thus at least partially embedded in the elastomer material of the tread 16 itself. The tread 16 is provided with a plurality of radial through-apertures 20, each of which communicates with a corresponding through-aperture 21 provided in the tubular body 18. Advantageously, the apertures 20 and 21 are elongate in the circumferential direction, and are aligned with one another in order to form circumferential rows of apertures which are spaced from one another in an axial direction. Advantageously, the apertures 20 are closed by means of materials 20a which are permeable only to water, and advantageously by means of porous materials.

The tread 16 is grooved by producing only a plurality of circumferential grooves 22, into which there open the through-apertures 20 provided through the tread 16.

As illustrated in FIG. 1, and in particular in FIGS. 2 and 3, each of the sidewalls 15 comprises a respective frusto-conical resilient annular membrane 24 with a straight generatrix which forms an angle A other than 90° with the axis 13, and is advantageously variable between 75 and 85°. In FIG. 3, the generatrices of the membranes 24 converge towards one another and towards the tread 16, meeting at a point, not illustrated, outside the tread 16 itself, whereas in FIG. 2, the generatrices diverge from the wheel rim 2 and thus meet at a point inside the tyre 3.

Figure 5:
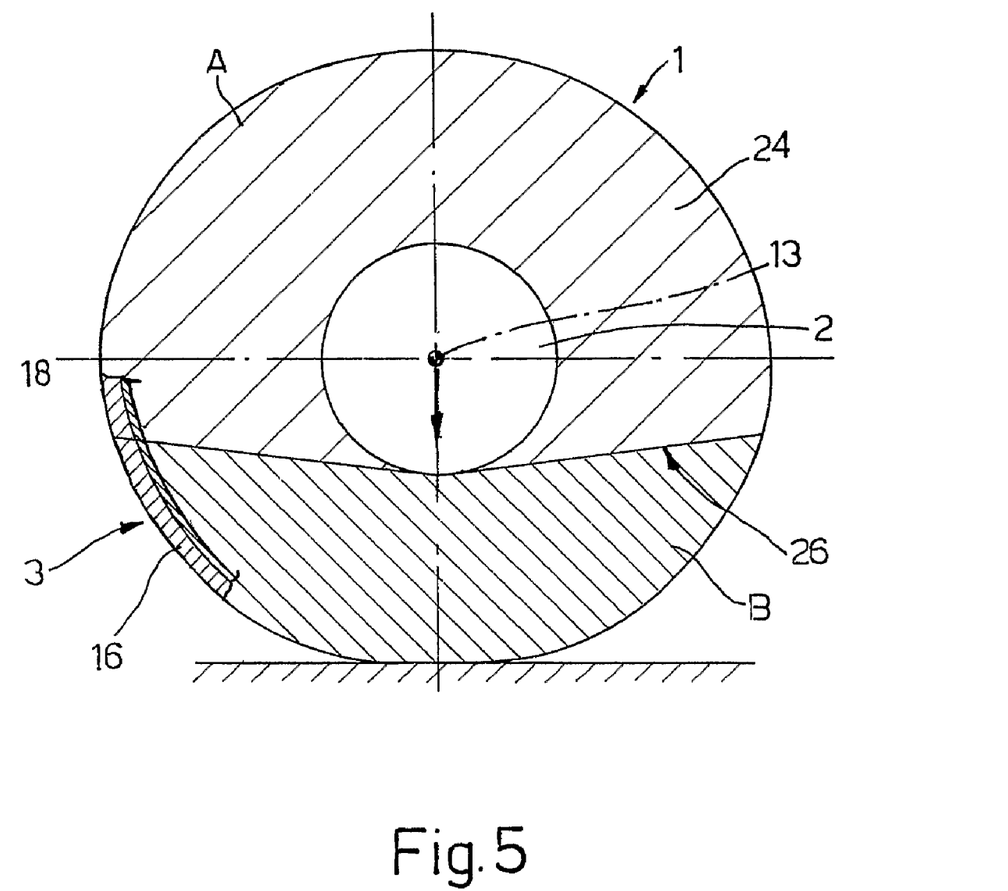
FIG. 5 illustrates schematically a tyre showing areas with different stresses.

Again with reference to FIGS. 2 and 3, the membranes 24 have cross-sections which are substantially constant in a radial direction, and radial half-sections which are substantially rectangular, and, according to a first embodiment, are reinforced by means of fibre materials not shown in the attached figures, such as to be anisotropic. The fibres of the fibre material are distributed and oriented such as to prevent localised deformations of the membranes 24 under static load, in particular in the area immediately beneath the wheel rim 2. Specifically, the fibres are distributed and oriented such that the tension stresses present in the different points of the membranes in conditions in which a load is applied, are contained within a dihedron 26 which is tangent to the beads 8, has a vertex parallel to the axis 13, and is disposed in use below the axis 13 itself, as illustrated in FIG. 5. By this means, the portions A (FIG. 5) of the membranes 24 which are contained within the dihedron 26 are stretched between the corresponding portions of the tubular body 18 and the wheel rim 2, whereas the portions B of the membranes below the dihedron 26 are not subjected in practice to tension stresses, and can thus be deformed freely under the action of the load transmitted by the wheel rim 2. As a result of the deformation of the portions B, the actual radius of curvature of the part of the tyre beneath the dihedron 26 increases, tending towards infinity at the vertical plane which passes through the axis 13 (FIG. 5). The part of the tyre which is subjected to traction stress, i.e. which is contained within the dihedron 26, supports the load, thus guaranteeing the resilience required for satisfactory driving comfort. In other words, in the wheel unit 1, the wheel rim 2, which, as is known, transmits the load to the tyre, is "suspended" from the portions A of the membranes 24, by this means "releasing" the portions B.

Figure 6:
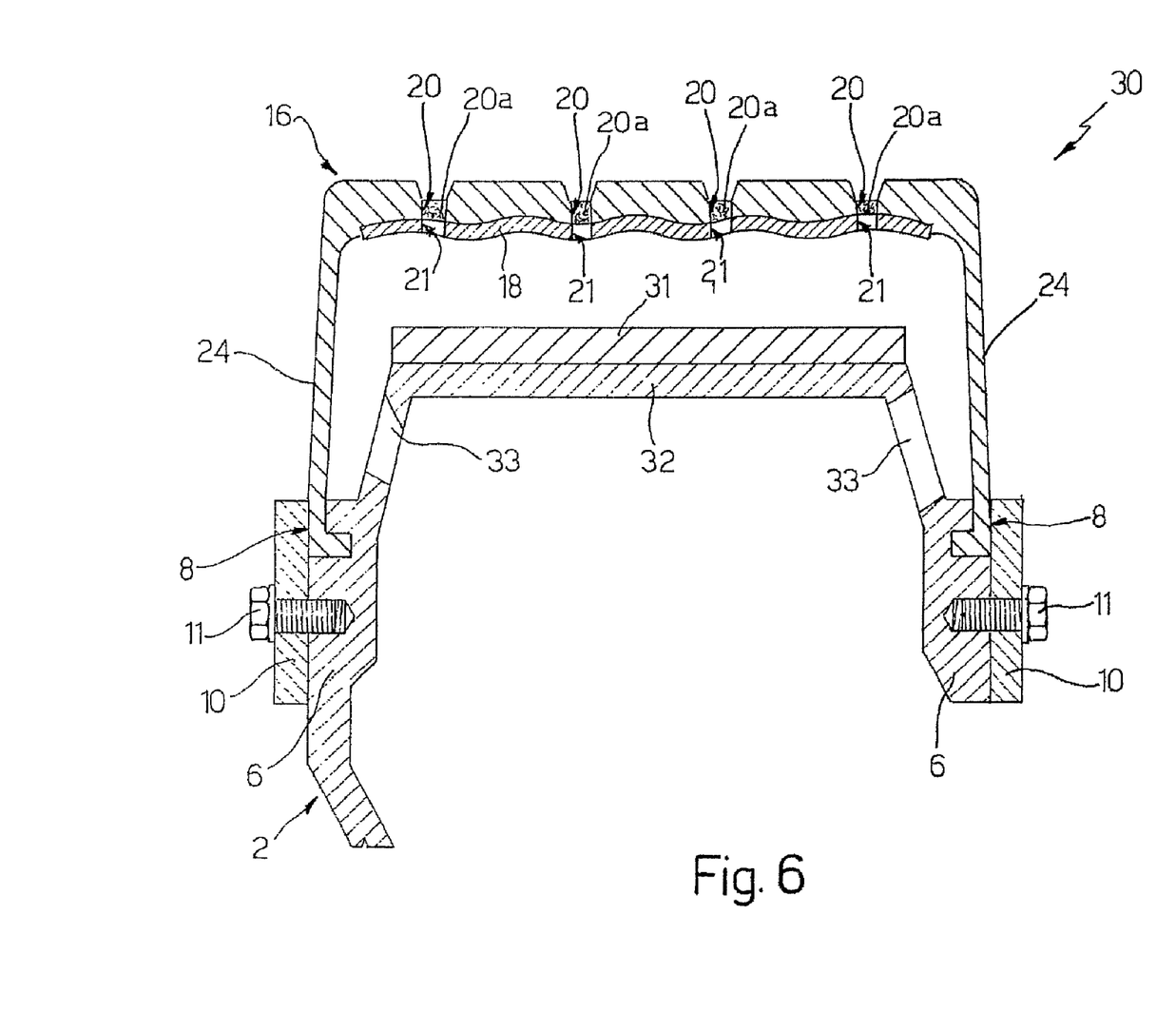
FIG. 6 illustrates a variant of some details of FIGS. 2 and 3.

The variant illustrated in FIG. 6 relates to a tyre 30 which differs from the tyre 3 only in that the membranes 24 are made of isotropic and homogeneous elastomer material. Advantageously, the membranes 24 are made of polybutadiene rubbers or polyisoprene rubbers, treated in order to withstand atmospheric agents, or of polycondensate of dimethylsilanol and derivatives, when the methyl groups are replaced by vinyl or phenolic groups. At rest, i.e. in a non-deformed condition, each of the membranes 24 has radial dimensions which are smaller than the radial distance between the tread 16 and the corresponding bead 8. When it is connected to the tread and to the corresponding bead 8, each membrane 24 is stretched radially such that in the condition in which the tyre is at rest, i.e. in the absence of external stresses, it is perfectly pre-tensioned. The level of pre-tensioning of the membranes 24 is selected according to the load which acts on the tyre, and in each case such that in use, i.e. when the tyre is in a loaded condition, the portions B of the membranes 24 still have a residual traction load. By this means, the generatrix of the membranes 24 is always kept straight in practice, including on the vertical plane which passes through the axis of the tyre.

In order to avoid excessive deformations of the membranes 24 in conditions of sudden stresses, for example when the wheel encounters a "step", the wheel rim comprises an annular portion 31 (FIG. 6) made of elastomer material, which in use is disposed coaxially to the axis of the wheel rim and faces the body 18, such as to constitute under limit conditions a support or a stop for the body 18 itself. The portion 31 is supported by a metal portion 32 of the wheel rim, which portion is supported by a plurality of spokes 33.

Figure 7:
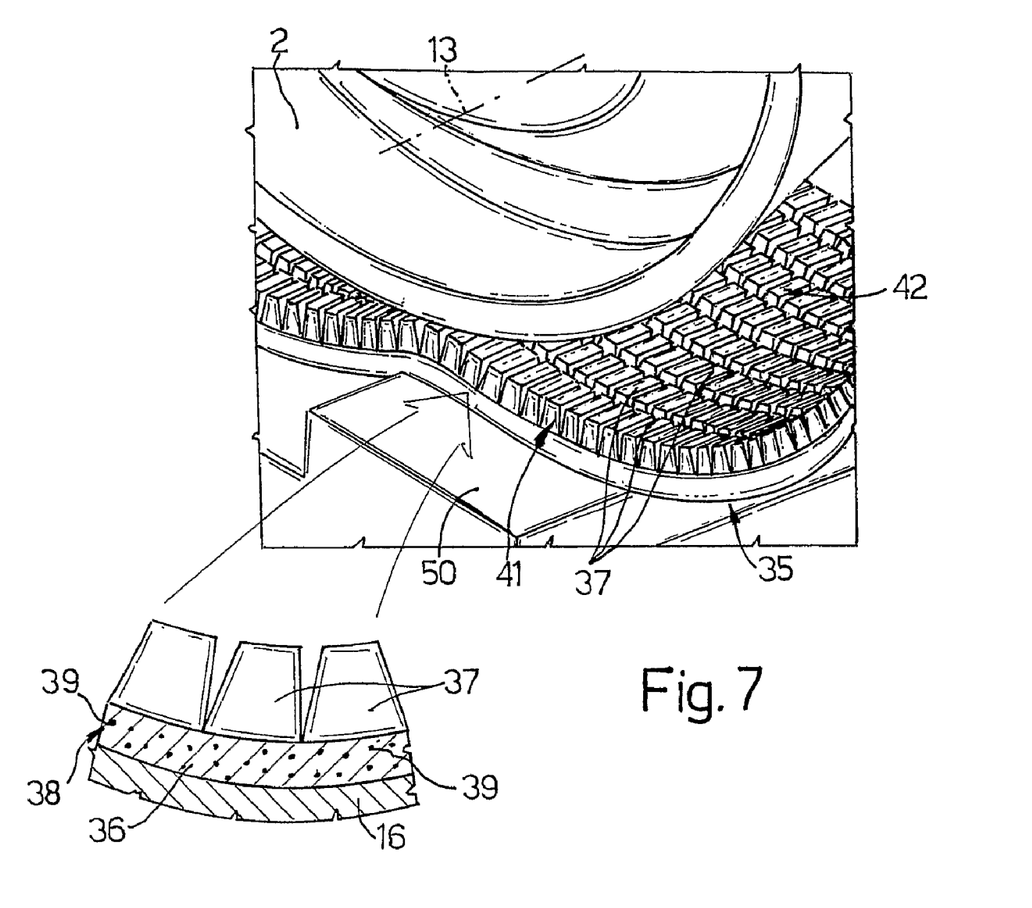
FIG. 7 is a further variant of the detail of FIG. 4, disposed in a deformed condition.

FIGS. 7 and 8 illustrate partially a tubular reinforcement body 35, which is always associated with the tread 16, has a dimension measured parallel to the axis 13 which is substantially the same as that of the tread 16 measured in the same direction, and differs from the reinforcement body 18 in that it has predetermined differentiated resistance to stress, i.e. which is dependent on the stress to which it is subjected. Specifically, the tubular body 35 comprises a continuous outer annular belt 36 and a plurality of blocks 37 which are supported by the belt 36 itself. The belt 36 is flexible and can withstand the circumferential tension actions which act on the reinforcement body 35, and preferably comprises a portion 38 of elastomer material and a plurality of reinforcement threads or fibres 39 which may or may not be braided, embedded in the portion 38 of elastomer material. The belt 36, which extends along the entire width of the tread 16, is connected integrally to the tread 16 itself, for example by means of vulcanisation or by being glued, or in a manner such that it can be dismantled or detached, such as to permit replacement of the tread 16 alone when it has reached a limit wear value. According to a variant, the belt 36 does not have the portion 38 of elastomer material, and comprises only a braid of threads or strips.

Figure 8A:
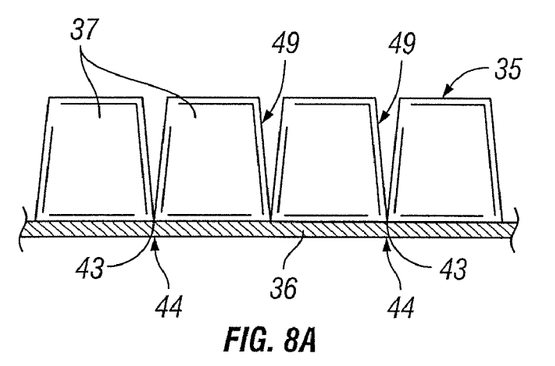
FIG. 8 illustrates schematically the detail of FIG. 7 in two different functional conditions.
Figure 8B:
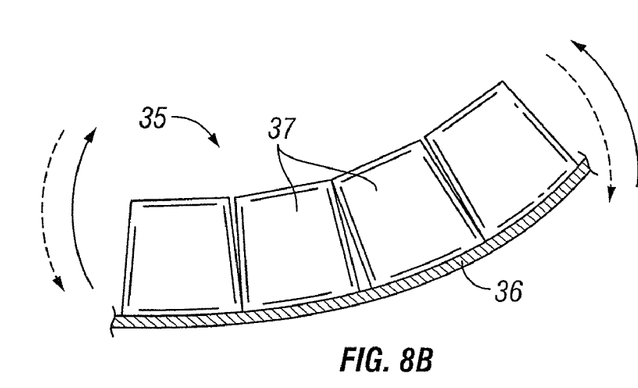
Figure 9:
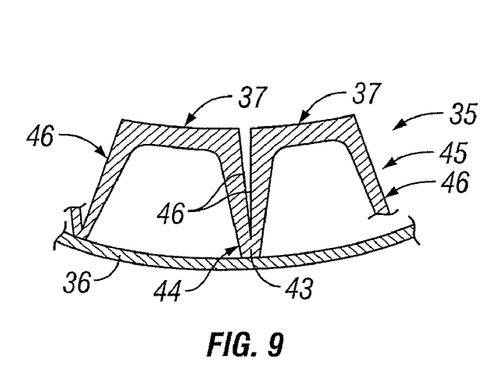
FIGS. 9 and 10 illustrate in cross-section two different variants of a detail of FIG. 7.
Figure 10:
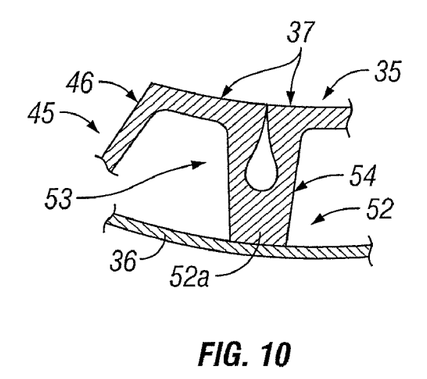

Again with reference to FIGS. 7 and 8, the belt 36 supports the blocks 38, which are connected integrally to the belt 36, for example by being vulcanised or simply by being glued, project towards the interior of the tyre 3, and can create action which resists the circumferential actions of compression which act on the reinforcement body 35 during rotation of the tyre 3. The blocks 37, which can consist of solid bodies, as illustrated in FIGS. 7 and 8, or of hollow bodies as illustrated in FIGS. 9 and 10, are adjacent to one another and aligned in order to define a plurality of axial rows 41 of blocks, i.e. which are parallel to the axis 13 of the tyre, and a plurality of circumferential rows 42 of blocks. In the example illustrated, the blocks 37 have the same dimensions and geometry as one another, and each have a frusto-conical form with a quadrangular base, which is advantageously rectangular with the larger side parallel to the axis 13. The blocks 37 are tapered towards the interior of the tyre 3 and each have a respective larger base which faces the belt 36 and is connected to the larger base of the adjacent block 37 by means of a respective flexible joining portion 43 (FIGS. 8 and 9). The joining portions 43 define respective virtual hinges 44 which hinge each block 37 on the one adjacent to it. In the embodiment illustrated in FIGS. 9 and 10, the blocks 37 constitute together with the flexible joining portions 43 parts of a flexible thermoplastic material alveolar body 45 made in a single piece, advantageously from polypropylene or polyamide material. Alternatively, the blocks 37 are solid bodies made of plastics or elastomer material, and are connected to one another in order to define a monolithic body. In both cases, the blocks 37 are shaped such that, if the tyre 3 is unloaded, their lateral walls 46 are simply disposed adjacent to one another, or are forced against one another in order to define a preloaded reinforcement body.

In use, when the wheel rim 2 transmits the load to the tyre 3, the various portions of the reinforcement body 35 act differently according to the position which they occupy in relation to the area of contact with the support surface of the wheel unit 1. Specifically, in the area of contact of the wheel unit-support surface, as a result of the load transmitted to the tread 16, the blocks 37 are rotated relative to one another in opposite directions around a respective axis of pivoting (as illustrated in FIG. 8a), and define between one another respective V-shaped notches 49 which widen towards the interior of the tyre 3, whereas in the areas to the right and left of the said area of contact, they are forced against one another (as illustrated in FIG. 8b), in order to withstand the load transmitted to the tyre 3 by the wheel rim 2.

When the wheel unit encounters "a step", indicated as 50 (FIG. 7), or when a concentrated load is applied to it from the exterior, as illustrated in FIG. 7, the virtual hinges 44 apply minimal resistance to the deflection of the reinforcement body towards the interior of the tyre 2, such that the various blocks 37 rotate in opposite directions to one another, thus becoming spaced from one another progressively and in proportion with their distance from the step 50, as illustrated in FIG. 7. In this situation also, the blocks 37 which are disposed in the vicinity of the step 50 delimit between one another a series of V-shaped notches 49, the widening of which, again as can be seen from FIG. 7, is variable, and reaches a maximum value at the step 50, and values which gradually decrease as the distance from the step 50 itself increases.

In order to limit the rotation of the blocks 37, particularly in the presence of pronounced steps, the portions 43 are replaced by reinforced portions 52, as illustrated in FIG. 10. Each portion 52 comprises a solid bead 52a, from which there extend integrally the resilient lateral walls 46 of the respective blocks 37. By this means, the virtual hinge 44 which is disposed in the solution in FIG. 9 between two adjacent blocks 37, is replaced by two virtual hinges 53 and 54, which are each defined by a section of the wall of the corresponding block adjacent to the bead 52a. In relation to the hinges 44 the hinges 53 and 54 are thus displaced towards the free ends of the blocks 37, such that in addition to a predetermined angle of rotation of the blocks 37, the solid beads 52a apply torque which opposes that which rotates the blocks 37 opening up, thus limiting the deformation of the reinforcement body 35 and of the tread 16 towards the interior of the tyre 3.

It is apparent from the preceding description that in comparison with the known solutions, the wheel unit 1 described firstly does not need to be pressurised, thus solving all the functional and maintenance problems associated with the presence of air or another pressurised fluid.

Furthermore, and again in comparison with the known solutions, the tyres 3,30 described ensure optimum resilience and deformability when loaded, and simultaneously a reduced hysteresis. These particular features are derived partly from the presence of the membranes 24, and partly from the design characteristics of the reinforcement bodies 18 and 37. In the case of the body 37, it is obvious in particular that the belt 36 and the blocks 37 allow the tyre to adapt to the different load conditions and according to the obstacles encountered during rolling, thus becoming deformed differently and in a controlled manner according to the stress to which it is subjected. The tyre consequently obtains fluidity of performance even in conditions in which there are substantial obstacles, and therefore a high level of driving comfort in any situation, for the same road hold conditions.

Furthermore, the absence of pressurised fluid makes it possible to provide through-apertures, both through the tread 16 and the tubular reinforcement bodies 18 and 35, and through the wheel rim 2, and in particular through the wall of the wheel rim which, in the known solutions, delimits the pressure chamber, together with the tyre. In fact, in the specific case of the reinforcement body 35, it is apparent that through apertures can be obtained by removing one or more blocks 37, or through the smaller bases or the lateral wall of the blocks 37 themselves.

The passages provided through the tread and the tubular reinforcement body 18 serve a dual purpose. Firstly, in fact, they permit discharge of the water alone which is present in the tread/road surface interface, towards the interior of the tyre, and from there to the exterior, via the apertures 14 in the wheel rim 2. The presence of the passages 20 and 21 through the tread 16 and the reinforcement body 18 thus provides greater freedom in the grooving of the tread 16 itself, since it avoids creation of the conventional transverse channels for lateral discharge of the water, which are essential in the known solutions in order to obtain the required hold on the road surface, but are a source of undesirable acoustic emissions. In addition, the presence of the passages 20 and 21 makes it possible to reduce and control the temperature of use of the tyre, with an obvious increase in the efficiency and reliability of the tyre itself. The fact of providing porous materials for closure of the apertures 20 prevents intake into the tyre of solid bodies such as stones, gravel and/or sand.

The fact of not having to provide a chamber for the pressurised fluid also increases the freedom of design and production of the wheel rim 2, which can thus have forms and geometries which are not permitted by the type of tyres now used. Finally, the greater freedom of form of the wheel rim comprises a substantial reduction in the weight of the wheel unit, as well as a further reduction in the hysteresis of the wheel unit itself.

It is apparent from the preceding description that modifications and variations which do not depart from the field of protection of the claims, can be made to the wheel unit 1 described. In particular, a different method could be provided for connection of the beads 8 to the wheel rim 2, and an additional tubular body could be disposed on the interior or exterior of the body 18,35 in contact with the body 18,35 itself or in a position spaced from the latter.

In addition, both the tubular bodies 18 and 35 and the tread 16 could dispense with the respective apertures 20 and 21, and the wheel rim could dispense with the apertures 14, and could comprise other through-apertures, provided for example through the flanges 6. Furthermore, when they exist, the apertures 20 and 21 could have dimensions and/or geometries which are also very different from those illustrated by way of example, and in particular they could have axial dimensions which are particularly small, in order to prevent the intake of foreign bodies into the tyre.

Finally, the membranes 24 could constitute only an intermediate or end part of the respective sidewalls 15, or they could have cross-sections which are variable in a radial direction. If the membranes are pre-tensioned, when "at rest" they have a radial dimension smaller than the distance between the beads and the tread.

In addition, as far as the body 35 is concerned, it is apparent that the blocks 37 could have forms and dimensions other than those described by way of example, and the distribution and orientation of the blocks 37 could also be different. In particular, a plurality of continuous axial blocks could be provided which are or are not parallel to the axis 13, extending along the entire width of the tread and delimiting between one another respective continuous axial notches. Furthermore, in order to adapt to particular curvatures of the tread 16, in particular at the shoulders of the tyre, the blocks 37 could have heights which differ from one area to another, and in particular could have a reduced height in the vicinity of the said shoulders.

The invention claimed is:

1. Tyre for vehicles, in particular for motor vehicles, which has an axis of symmetry and comprises a tread, two sidewalls, two beads which are attachable to a wheel rim, the beads being made of elastomer material, and at least one tubular reinforcement body for coaxial reinforcement on the said axis, which is surrounded by the said tread and extends between the said sidewalls; each of the said sidewalls comprising a respective resilient annular membrane with a straight generatrix which forms an angle (A) other than 90° with the axis of the tyre; characterised in that the said tubular reinforcement body comprises an annular belt and a plurality of blocks which are supported by the said annular belt in positions adjacent to one another, and can be forced against one another in order to apply resistance to the circumferential actions of compression present on the tyre during the rotation of the tyre itself; the said blocks being tapered towards the interior of the tyre and distributed in order to form a plurality of axial rows parallel to the said axis and a plurality of circumferential rows.

2. Tyre according to claim 1, characterised in that the said tubular body has a dimension measured parallel to the said axis which is substantially the same as that of the tread measured in the same direction.

3. Tyre according to claim 1, characterised in that the tubular body is at least partially embedded in the said tread.

4. Tyre according to claim 1, characterised in that the generatrices of the said membranes converge towards one another in order to meet at a point outside the tread.

5. Tyre according to claim 1, characterised in that the generatrices of the said membranes converge towards one another in order to meet at a point inside the tyre.

6. Tyre according to claim 1, characterised in that the said membranes have cross-sections which are substantially constant in a radial direction.

7. Tyre according to claim 6, characterised in that the said cross-sections are substantially rectangular cross-sections.

8. Tyre according to claim 1, characterised in that the said beads comprise at least one annular projection which can engage with a corresponding retention seat when it is fitted onto the wheel rim.

9. Tyre according to claim 1, characterised in that the said tread is vulcanised onto an outer surface of the said tubular body.

10. Tyre according to claim 1, characterised in that the said membranes are stretched radially between the said tread and the said beads such as to be pre-tensioned in the absence of loads on the tyre.

11. Tyre according to claim 1, characterised in that the said membranes are made of homogeneous elastomer material.

12. Tyre according to claim 11, characterised in that the said homogeneous material is an isotropic material.

13. Tyre according to claim 11, characterised in that the said membranes are made of polybutadiene rubbers.

14. Tyre according to claim 11, characterised in that the said membranes are made of polyisoprene rubbers.

15. Tyre according to claim 11, characterised in that the material of which the said membranes are made comprises polycondensate of dimethylsilanol, wherein the methyl units are substituted by vinyl or phenolic units.

16. Tyre according claim 1, characterised in that the said blocks project from the said annular belt towards the interior of the tyre.

17. Tyre according to claim 1, characterised in that the said annular belt comprises a plurality of reinforcement threads or strips.

18. Tyre according to claim 17, characterised in that the said annular belt comprises a portion of elastomer material in which the said reinforcement threads or strips are embedded.

19. Tyre according to claim 18, characterised in that the said annular belt is glued to the said tread.

20. Tyre according to claim 17, characterised in that the said annular belt is connected integrally to the said tread.

21. Tyre according to claim 17, characterised in that the said tread is connected to the said annular belt in a manner such that it can be released, so that it can be replaced when it reaches a wear limit.

22. Tyre according to claim 1, characterised in that the said blocks delimit between one another notches which extend in a direction substantially parallel to the said axis.

23. Tyre according to claim 1, characterised in that the said blocks are solid bodies.

24. Tyre according to claim 1, characterised in that the said blocks are connected integrally to the said belt by being glued or vulcanised.

25. Tyre for vehicles, in particular for motor vehicles, which has an axis of symmetry and comprises a tread, two sidewalls, two beads which are attached to a wheel rim made of elastomer material, and at least one tubular reinforcement body for coaxial reinforcement on the said axis, which is surrounded by the said tread and extends between the said sidewalls; each of the said sidewalls comprising a respective resilient annular membrane with a straight generatrix which forms an angle (A) other than 90° with the axis of the tyre; characterised in that the said tubular reinforcement body comprises an annular belt and a plurality of blocks which are supported by the said annular belt in positions adjacent to one another and are in a radial internal position with respect to the belt such that the blocks project towards the interior of the tyre, and can be forced against one another in order to apply resistance to the circumferential actions of compression present on the tyre during the rotation of the tyre itself, the blocks being hollow bodies.

26. Tyre according to claim 25, characterised in that the said tubular reinforcement body has an alveolar structure.

27. Tyre of claim 25, wherein the said blocks are tapered towards the interior of the tyre and connected to one another by connection portions, the said blocks and the said connection portions constituting part of a body made in a single piece.

28. Tyre of claim 27, wherein the connection portions include solid portions interposed between the belt and the blocks, the solid portions, during the rotation of the tyre, being adapted to apply action which opposes that which generates the relative displacement of the said blocks.

29. Tyre of claim 27, further comprising virtual hinges defined by a section of a wall of a said block adjacent the connection portions, the virtual hinges being adapted to permit displacement of the blocks relative to one another during the rotation of the tyre.

* * * * *